(12) United States Patent
Roy

(10) Patent No.: US 7,818,416 B2
(45) Date of Patent: Oct. 19, 2010

(54) COMMUNICATIONS SYSTEM AND METHOD FOR ACCESSING A SERVER AND PREVENTING ACCESS BLOCKING AND MINIMIZING NETWORK TRAFFIC

(75) Inventor: Shaibal Roy, Sammamish, WA (US)

(73) Assignee: Teamon Systems, Inc., Wilmington, DE (US)

(*) Notice: Subject to any disclaimer, the term of this patent is extended or adjusted under 35 U.S.C. 154(b) by 1575 days.

(21) Appl. No.: 10/789,452

(22) Filed: Feb. 27, 2004

(65) Prior Publication Data
US 2005/0193111 A1 Sep. 1, 2005

(51) Int. Cl.
G06F 15/173 (2006.01)
G06F 15/16 (2006.01)
(52) U.S. Cl. .................... 709/224; 709/217; 709/219
(58) Field of Classification Search .................... None
See application file for complete search history.

(56) References Cited

U.S. PATENT DOCUMENTS

| | | | | |
|---|---|---|---|---|
| 5,559,505 A * | 9/1996 | McNair | ................ | 340/5.28 |
| 5,774,668 A | 6/1998 | Choquier et al. | ........ | 395/200.53 |
| 6,240,462 B1 | 5/2001 | Agraharam et al. | ......... | 709/238 |
| 6,317,786 B1 | 11/2001 | Yamane et al. | .............. | 709/224 |
| 6,345,294 B1 | 2/2002 | O'Toole et al. | ............. | 709/222 |
| 6,401,121 B1 | 6/2002 | Yoshida et al. | .............. | 709/227 |
| 6,453,430 B1 * | 9/2002 | Singh et al. | ................... | 714/47 |
| 6,473,413 B1 | 10/2002 | Chiou et al. | ................ | 370/331 |
| 6,587,032 B2 * | 7/2003 | Armingaud | ................ | 340/5.31 |
| 6,631,137 B1 | 10/2003 | Lorrain et al. | .............. | 370/401 |
| 6,665,824 B1 * | 12/2003 | Ruhlen et al. | .................. | 714/57 |
| 6,823,382 B2 * | 11/2004 | Stone | ......................... | 709/224 |
| 7,096,496 B1 * | 8/2006 | Challener et al. | ............. | 726/17 |
| 7,139,917 B2 * | 11/2006 | Jablon | ......................... | 713/183 |
| 7,213,065 B2 * | 5/2007 | Watt | ............................ | 709/223 |
| 7,233,989 B2 * | 6/2007 | Srivastava et al. | ........... | 709/224 |
| 7,251,254 B2 * | 7/2007 | Bond et al. | ................ | 370/467 |
| 2001/0032245 A1 * | 10/2001 | Fodor | ......................... | 709/206 |
| 2002/0052972 A1 | 5/2002 | Yim | ........................... | 709/245 |
| 2002/0080752 A1 | 6/2002 | Johansson et al. | ........... | 370/338 |
| 2002/0188738 A1 | 12/2002 | Gray | .......................... | 709/229 |
| 2002/0199020 A1 | 12/2002 | Trace et al. | .................. | 709/245 |
| 2003/0076841 A1 | 4/2003 | Boxall et al. | ................ | 370/401 |
| 2003/0088765 A1 | 5/2003 | Eschbach et al. | ............ | 713/150 |
| 2003/0110248 A1 * | 6/2003 | Ritche | ......................... | 709/224 |

FOREIGN PATENT DOCUMENTS

EP 0491367 6/1992
EP 1259036 A 11/2002

* cited by examiner

Primary Examiner—John B. Walsh
(74) Attorney, Agent, or Firm—Allen, Dyer, Doppelt, Milbrath & Gilchrist, P.A.

(57) ABSTRACT

A communications system and method includes a database for storing problem magnitudes relating to failed attempts at accessing servers using connection engines. An intelligent routing engine could be a server operative with the database, which queries the database and delays any further attempts at accessing the server using the first connection engine if the problem magnitude exceeds a predetermined threshold. Reattempts can be made after a sufficient delay. A plurality of connection engines can be used by a client for accessing a server. The connection engines are preferably distributed among a plurality of subnets and/or IP addresses and a different connection engine can be chosen based on a desired route with minimum problems.

46 Claims, 4 Drawing Sheets

COMMUNICATIONS SYSTEM AND METHOD FOR ACCESSING A SERVER AND PREVENTING ACCESS BLOCKING AND MINIMIZING NETWORK TRAFFIC

FIELD OF THE INVENTION

The present invention relates to network communications, and more particularly, the present invention relates to accessing Internet servers.

BACKGROUND OF THE INVENTION

The Internet is growing exponentially and temporary network outages are commonplace on the Internet. A client, whether operating a personal computer at home, in a local area network, or from a mobile, wireless device, often attempts access to a server on the Internet (e.g., a website, an e-mail server), but fails to connect to the server and initiate the communications session. After repeated failures in accessing a server, a user may wait a period of time and try again, perhaps making a successful connection or failing to make a connection. In the case of failing to connect, the server could be actively blocking a connection request. In other instances, however, a "failed" access attempt will be successful if retried after a sufficient delay. It has been found that sometimes a server may actively block or throttle connection requests based upon the originating IP address. At other times, the server or the Internet connectivity to the server may encounter intermittent and/or transient failures, including service and network failures.

It is necessary then to distinguish between a permanent or persistent transient failure in accessing the server, such as by a server consistently blocking access, and an intermittent or transient failure caused by other reasons. If it were possible to monitor every mail server or other Internet server to be accessed, then it would be possible to blacklist a particular server or devise a different connection engine route for a particular server. It would also be advantageous if some decision could be automatically made to determine when any reattempts should be made at accessing a server, and whether a set period of time should be allowed to pass before reattempting access, or if a different connection engine should be used to initiate communication.

SUMMARY OF THE INVENTION

The present claimed invention overcomes problems when temporary network outages occur on the Internet and "failed" access attempts are retried. The present invention is also advantageous as an aid to discern when certain servers may actively block a connection request.

In the present invention, connection engines can be distributed over multiple subnets and multiple IP addresses to prevent attempts at blocking. A database of failed attempts can be maintained and an intelligent routing server, such as a mobile office platform or other server system, could track the magnitude of failures as problem magnitudes stored in a database. Data can relate to the problem magnitude versus time for a specific connection engine and webpage or server. When a server has to be accessed, for example, as when a client checks an email server, the database can be consulted to choose a connection engine having a lower problem magnitude for the server of interest. A plurality of engines could be distributed over multiple servers and multiple subnets.

In one aspect of the present invention, a proxy engine, operative with WAP or SMTP, for example, makes a service request to a connection engine, which uses a POP, IMAP or HTTPmail protocol, for example. The connection engine attempts to access the server and, if errors are received, the database can store the failure for a particular connection engine and server pair by assigning a problem magnitude and adding it to a current exponentially decayed database entry along with a time stamp. The connection engine can make a determination of the type of error to distinguish network failures from other types of errors such as incorrect passwords, badly formed requests or similar errors not attributed to network failures. If the problem magnitude is below a set threshold, the next attempt is made after a sufficient delay. If the problem magnitude exceeds a threshold, the system will not retry and instead waits for the problem magnitude to decay to below the threshold before retrying. The delay can be a function of a preset rate of decay of the problem magnitude. A different connection engine with a lower problem magnitude for the same server can also be selected in one aspect of the present invention.

In one aspect of the present invention, a communications system includes a database for storing a problem magnitude relating to failed attempts in accessing a server using the connection engines. An intelligent routing engine is operative with the database, queries the database and delays any further attempts at accessing the server using a first connection engine if a problem magnitude exceeds a predetermined threshold. A communications system can also include a plurality of connection engines that can be used by a client for accessing a server of a server on an Internet Protocol (IP) network. These connection engines can be distributed among a plurality of subnets and/or IP addresses and other servers.

A method of the present invention is also disclosed, and in one aspect of the invention, comprises the steps of attempting access to the server using a first connection engine, assigning a problem magnitude if the attempt at accessing the server has failed, and delaying any further attempts at accessing the server using the first connection engine, if the problem magnitude exceeds a predetermined threshold.

In yet another aspect of the present invention, a method of accessing a server comprises the steps of distributing connection engines over multiple subnets and/or multiple IP addresses and attempting access to servers using the connection engines. Problem magnitudes are assigned to failures in accessing any servers. The problem magnitude versus time as related to a particular connection engine and server are stored within a database and a connection engine chosen which has minimum problems when a particular server is to be accessed. This decision can be based on queries made to the database. The server could, of course, be an email provider or other server.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
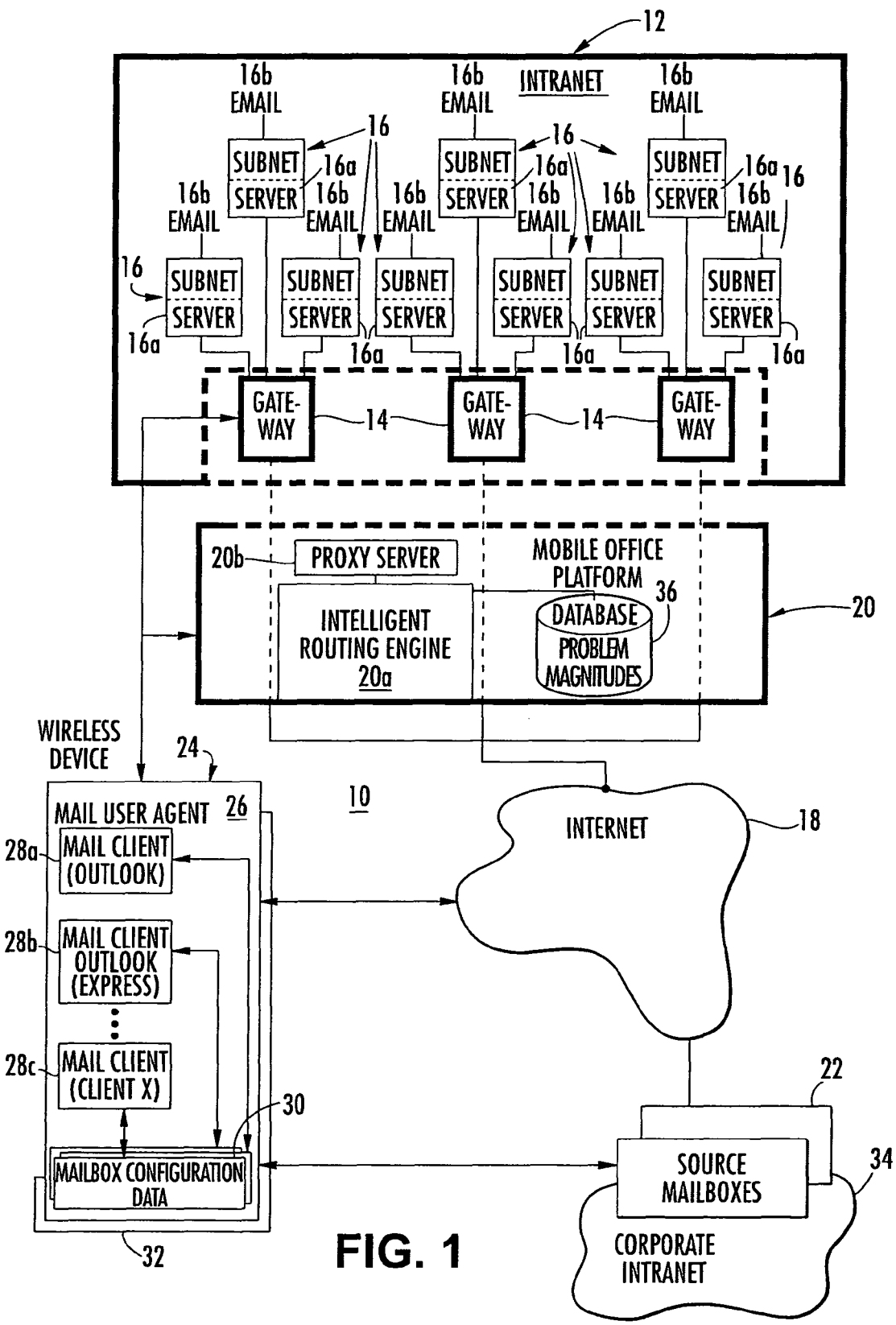
FIG. 1 is a high level block diagram of a system that includes a network having a number of connection engines distributed among a plurality of subnets and/or IP addresses, a database for storing problem magnitudes, and an intelligent routing engine as part of a mail office platform or other gateway that delays repeated attempts at accessing a server or selects a connection engine for use by a client, such as the illustrated wireless device.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention advantageously overcomes the disadvantages of the prior art, which did not accommodate temporary network outages with "failed" access attempts, did not determine whether reattempts at accessing at a server should be initiated, and did not determine whether the server may have been actively blocking a connection request.

In accordance with the present invention, connection engines can be distributed over multiple subnets and multiple IP addresses to prevent attempts at blocking access or allow alternative uses of connection engines. A database of failed attempts can be maintained and a problem magnitude system tracks a magnitude of failure for failed attempts at initiating a communications session with a server. The database stores the problem magnitude versus time for a specific connection engine and web page or server pair. When a server has to be accessed to check an email account, for example, the database can be consulted to choose a connection engine with a minimum problem magnitude for the server of interest.

In one aspect of the present invention, a plurality of different connection engines can be distributed over multiple servers and/or multiple subnets and/or multiple IP addresses. A proxy engine can be operative with a Wireless Application Protocol (WAP), Simple Mail Transfer Protocol (SMTP) or other protocol. The server can make a service request to a connection engine, operative, for example, with a Post Office Protocol (POP), an Internet Mail Access Protocol (IMAP), HTTPmail protocol or other similar protocol.

If various errors are received, a database can store this failure for a particular connection engine and server pair by assigning a problem magnitude, for example, ten (10), and adding it to a current, exponentially decayed entry in the database along with a time stamp. Different errors can be given a different indicator, such as a 4XX error as a persistent transient failure, also known as a network failure. A 5XX error could include other errors unrelated to network errors, for example, an incorrect password or badly formed request. If the problem magnitude is below a predetermined threshold, a new attempt at access can be made after a sufficient delay. If a problem magnitude exceeds a threshold, then the system may not retry, and instead, could wait for the problem to return to below a threshold before retrying. A delay could be a function of a preset rate of decay of the problem magnitude. Also, if it is determined that a server is blocking or is having other connection problems based on an IP address, for example, it is possible to try a different connection engine.

FIG. 1 shows an overall block diagram of an example of a basic communications system 10 and showing examples of the various functions and components that could be used with the present invention. As illustrated, a large corporate intranet 12 could include a number of gateways 14 (although only one is necessary in some instances) operative as servers and/or routers and connected and operative with various subnets 16 and associated servers 16a. The different subnets 16 can be operative with various email clients, systems and/or servers 16b, as non-limiting examples.

It should be understood that a subnet 16 as used herein can correspond to a portion of a network, such as the illustrated intranet 12 having a common address component, but subdivided into separate parts or segments. A single shared network address can allow different computers and clients to be connected to the Internet with a single shared network address. It is also possible to have multiple connections to the Internet with different IP addresses, but a shared address could be used for certain areas of the network, each having subnets.

It should also be understood that any portion of an IP address could represent a network number or address and some portion could represent local machine addresses as a host number or address. For example, it is possible to use 16 bits for a network number and 16 bits for a host number. With subnets, some portion of the host address is used for a subnet address. For example 8 bits could be used, but in other schemes, using only part of a third quad or fourth quad could be used. The subnet mask is used to determine what subnet and IP address it belongs and acts as a screen for the numbers to tell which numbers to look at underneath for routing.

The intranet 12 can include one or more gateways 14, each acting as a network point as an entrance to the Internet 18 or to a server operative as a mobile office platform in this non-limiting example. The gateways could also be an entrance to other networks and/or act as a node or host (end-point) node. The gateways 14 could also be an Internet service provider (ISP), and could be operative as a proxy server and/or a firewall server, and also be associated with a router.

FIG. 1 illustrates the mobile office platform 20 as a server that includes various functions, including software engines operative as an intelligent routing engine 20a and proxy agent 20b, and performing other functions, including that of an electronic mail agent for various source mailboxes 22. It should be understood that the gateways 14 of the intranet 12 could also be operative as intelligent routing engines and Internet service providers (ISP's) as shown by the dotted lines connecting the mobile office platform 20 with the gateways 14.

As illustrated, a wireless device 24, such as a hand-held Blackberry unit, includes a mail user agent 26 operative with the server acting as a mobile office platform 20. The device 22 is also operative with the intranet gateways 14. The wireless device is only one example of a user system. Other systems, including a personal computer or other mobile device, can be operative with the present invention.

The mobile office platform 20 is operative as a mailbox interface module and includes the intelligent routing engine and a mail agent that communicates with source mailboxes 22. The wireless device 24 is operative as a mail user agent 26 and could include various email clients, which in this example, correspond to an outlook mail client 28a, an outlook express mail client 28b, and a proprietary mail client 28c (client X), each associated with respective source mailboxes. The mail user agent 26 could also include mailbox configuration data 30 for each of the email clients 28a-c. It should be understood that the various email clients could be located on different agent systems as part of one or more wireless devices, as illustrated by the second agent system 32, each having a mail user agent.

In this example, the mail user agent 26 is operative with the mobile office platform 20 acting as an agent for the wireless device 24 to source mailboxes 22 and also as an agent to the Internet 18. The mail user agent 26 could also be operative with any of the gateways 14 of the intranet 12, depending on the configuration of the gateways and use of any gateway as an ISP. The source mailboxes could be located on the Internet 18, a corporate intranet 34, or both. The mail user agent could also be operative with different email systems in the Internet. The mobile office platform 20 can act as an agent, performing various functions, including various functional and validator modules. It should also be understood that some of the functions of the mobile office platform as an agent can also be downloaded to a user system and operative by a user, as when inputting information into a mobile device or home computer.

As illustrated, the mobile office platform 20 is operative with a database 36 for storing problem magnitudes relating to failed attempts at accessing servers using connection engines. In the present invention, a plurality of connection engines can be used by a client, for example, operative on the mobile, wireless device 24. These connection engines are preferably distributed among the subnets 16 and/or IP addresses through the various gateways 14 and subnets 16. The database 36 can store a problem magnitude versus time relating to a particular connection engine and associated servers after attempts have been made to access servers using the connection engines and problem magnitudes have been assigned to any failures in accessing the servers. A connection engine with minimum problems can be selected by the intelligent routing engine 20a when a particular server is to be accessed based on stored data within the database 36.

The database 36 could also include data relating to a current problem magnitude for a failed access to a server that is added to a current exponentially decayed entry related to a problem magnitude for accessing the server. The database 36 could include data relating to a problem magnitude versus time for any server and connection engine pair. Problem magnitudes can be assigned for an error based on network failures or other failures unrelated to a network failure, such as an incorrect password and/or poorly formed request. The intelligent routing engine 20a could be operative with a proxy server module 20b. A service request could be made using a wireless application protocol (WAP) or simple mail transfer protocol (SMTP). Attempts to access a server could be made using POP, IMAP or HTTPmail protocol.

It should be understood that the wireless application protocol (WAP) is operative with mobile devices and typically includes a mini-browser with requests sent to a gateway or other server using WAP. The gateway could retrieve information via HTTP from a server and encode the HTTP data with the wireless mark-up language (WML). The WML-encoded data is sent to the wireless device. The wireless application protocol stack can include a wireless application environment to hold tools that wireless Internet content developers use. It can include a wireless session protocol to determine whether a session between a device and a network will be connection oriented or connectionless. A wireless transaction protocol maintains data flow and is operative with a wireless transport layer security to provide security features such as found in the transport layer security (TLS) portion of TCP/IP. A wireless datagram protocol works in connection with a network carrier layer as a bearer.

Figure 2:
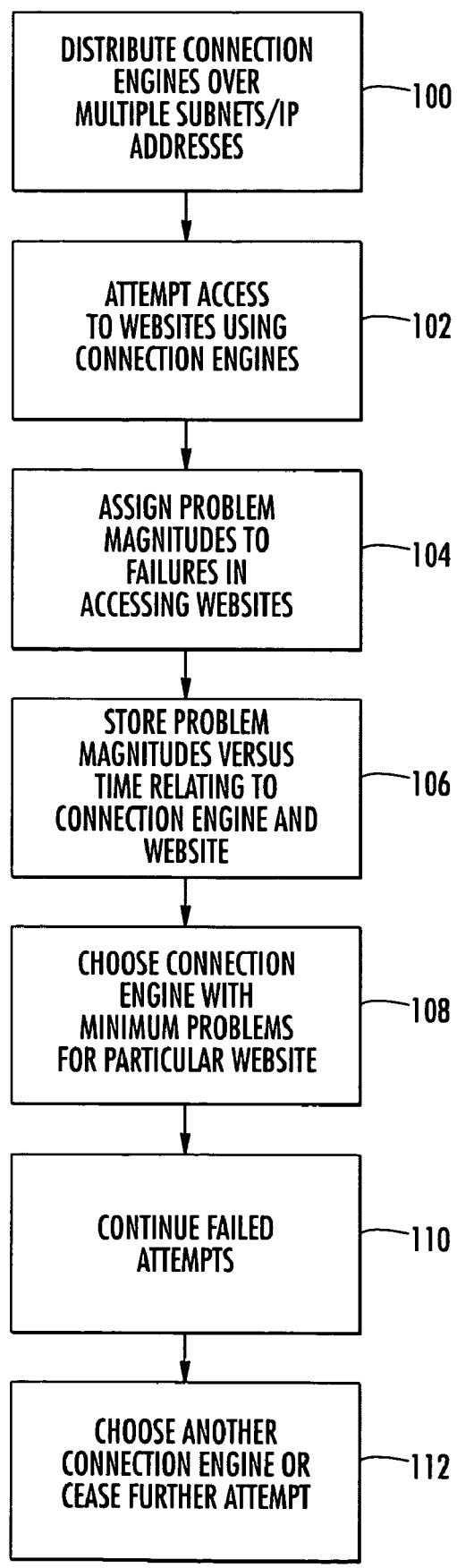
FIG. 2 is high level flow chart showing an example of the algorithm that can be used in the present invention.

FIG. 2 is a high level block diagram showing an example of the method of the present invention. As illustrated, connection engines are distributed over multiple subnets and/or multiple IP addresses (block 100). Access to servers is attempted using the connection engines (block 102). Problem magnitudes are assigned to failures in accessing servers (block 104). The problem magnitude versus time relating to a particular connection engine and server are stored within a database (block 106). A connection engine having minimum problems when a particular server is to be accessed is chosen based on stored data within the database (block 108). If attempts to access a server still fail after repeated attempts (block 110), another connection engine can be chosen if the problem magnitude exceeds a predetermined threshold or any further attempts at accessing a server can be delayed using a first connection engine, if the problem magnitude exceeds the threshold (block 112).

Figure 3:
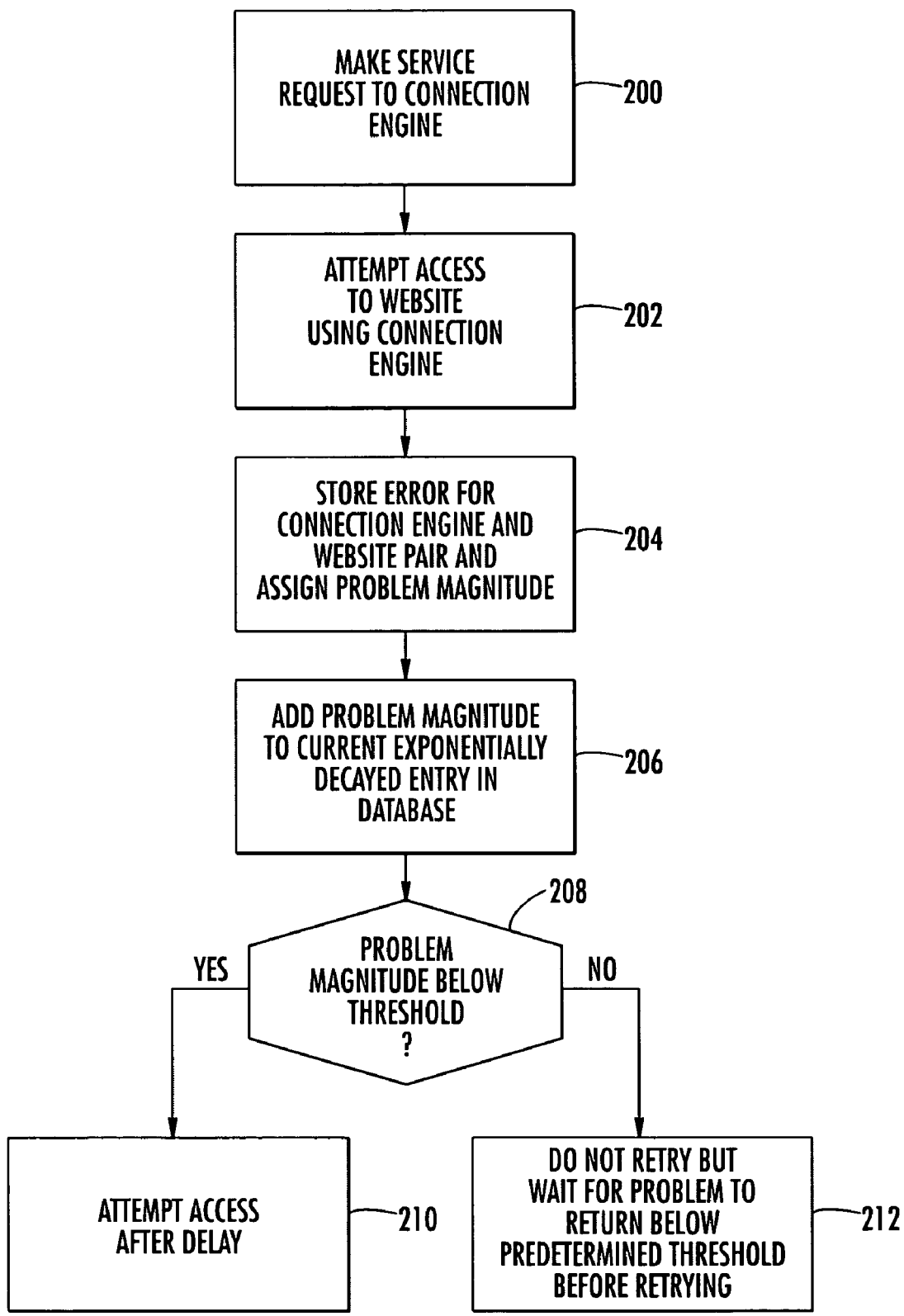
FIG. 3 is another flow chart illustrating a more specific example of a method used by the present invention.

FIG. 3 shows a specific example that can be used for the method of the present invention. A proxy engine can use WAP, SMTP or other protocol and make a service request to a connection engine, which uses POP, IMAP or HTTPmail protocol (block 200). The connection engine attempts to access the server (block 202). The database stores the type of error for a particular connection engine and server pair and assigns a problem magnitude (block 204). It then adds the problem magnitude to the current exponentially decayed entry in the database along with a time stamp (block 206). If the problem magnitude is below a predetermined threshold (block 208), the next attempt to access the server is made after a sufficient delay (block 210). If the problem magnitude exceeds a predetermined threshold, the system will not retry and instead waits for the problem to return below the predetermined threshold before retrying (block 212). This delay could be a function of a preset rate of decay of the problem magnitude. Thresholds can be chosen as required. Also, different connection engines can be chosen.

It should be understood that the software and programming used for the present invention can vary, and different applications can be used. The mobile office platform 20 and other gateways can use web services technology and include different application services used by those skilled in the art. Web services could include a combination of programming and data, which are available from a web server for web users, or the use of other web-connected programs as provided by an application service provider. Web services could use an extensible mark-up language (XML) as a standard for formatting data to be communicated.

Any type of arrangement can be used to access the mobile office platform 20 or other gateways, including a peer-to-peer arrangement, a central server, or other architecture and line or wireless communications. Also, middleware could be used. Data formats could be standardized and data exchanged using the extensive mark-up language (XML), which is a foundation for the web services description language (WSDL). Different web servers could be used, including the open source Apache or Microsoft's Internet information server (IIS). Other web services could include Novel's web server for users of its netware operating system or the IBM family of Lotus domino service, for example, for IMB's OS/390 and AS/400 customers. Naturally, any web server should be able to download requests for file transfer protocol (FTP) files in a preferred embodiment.

The mobile office platform 20 or other gateways can have various import agents that are designed to retrieve configuration data from email clients, including Eudora and Netscape besides the Outlook and Outlook Express email clients as illustrated. The mobile office platform or other gateways could include a Messaging Application Programming Interface (MAPI) to retrieve any configuration data for a MAPI-compliant email client. MAPI provides the application programming interface (API) to ensure system independence for messaging applications. A layer of functionality could be provided between applications at any underlying messaging systems and act as messaging middleware. MAPI-compliant applications could communicate through a MAPI subsystem to MAPI service providers that perform requested actions for clients and pass data back through a MAPI system to a MAPI client. Any mailbox configuration data could reside in a configuration registry of the user system. In other example embodiments, data could reside in email client specific configuration storage.

In the user system, the Microsoft Outlook Express mail client can access source mailboxes that use the Post Office Protocol (POP) or Internet Mail Access Protocol (IMAP). POP, of course, is the Internet mail server protocol that provides incoming message storage. The more recent protocol is POP3. POP is operative with a Simple Mail Transfer Protocol (SMTP). Any mail server could run both protocols if it is to receive, store and forward messages. The SMTP protocol exchanges messages from one mail server to another and hands messages to the required POP server for an email mailbox. A POP server can receive a message and hold it until another POP server is available. The IMAP version 4 also uses the SMTP transport mechanism, but it is a more flexible protocol because IMAP allows users to store mail on a mail server without downloading all new messages to a local machine. Internet mail services, of course, run SMTP and either POP or IMAP and receive incoming messages from any source without identity checking. Thus, mail can be selectively downloaded and read, message headers reviewed, hierarchical message stores built, an address book supported, and documents linked, authenticated and searched.

The mobile office platform or other gateway could generate configuration data objects and format data objects using an extensible mark-up language (XML) for submission to various XML-compliant web services. The server and/or web service could be a simple object access protocol (SOAP) compliant service.

XML, of course, as an extensive mark-up language, is a subset of the standard generalized mark-up language (SGML) and would allow data to be stored and published on servers and be richer in presentation. Custom tags could be created to define the content of documents. Common information formats could be created and the format and data shared on the Internet, corporate Internets and/or other networks. The mark-up symbols in XML could be unlimited and self-defining. The channel definition format (CDF) could describe any channel and a specific CDF file can contain data that specifies an initial web page and how it can be updated.

SOAP allows one program running in one kind of operating system to communicate with the program in the same or another type of operating system by using HTTP and XML for information exchange. SOAP could specify how to encode an HTTP header in an XML file, thus, allowing one computer to call a program in another computer and pass data, while also dictating how it can return a response. SOAP is advantageous to allow data to pass through firewall servers that screen-out requests other than those for known applications to a designated port. SOAP is an XML-based protocol that has at least three parts, including: (a) an envelope to define a framework for describing what is in a message; (b) a set of encoding rules for expressing application-defined data types; and (c) a convention for representing remote procedure calls and responses.

The mobile office platform 20 or other gateway could include software that is implemented as an ActiveX control as a component object model (COM) and provide a framework for building software components that communicate with each other. ActiveX controls could be automatically downloaded and executed by a web browser. Distributed object applications could be built in active web pages and ActiveX controls could be downloaded to different browsers and clients. ActiveX controls could be held in a web browser as a container and distributed over an Internet or corporate intranet. ActiveX controls could also manage and update web content and client systems and work closely with a user interface of a targeted operating system. Java applets or similar component objects could also be used instead of ActiveX controls. It should be understood for purposes of the present invention that an object model control could also be any type of dynamic link library (DLL) module that runs in a container as an application program using a component object model program interface.

An exemplary hand-held mobile wireless communications device 1000 that can be used in the present invention is further described in the example below with reference to FIG. 4. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 4:
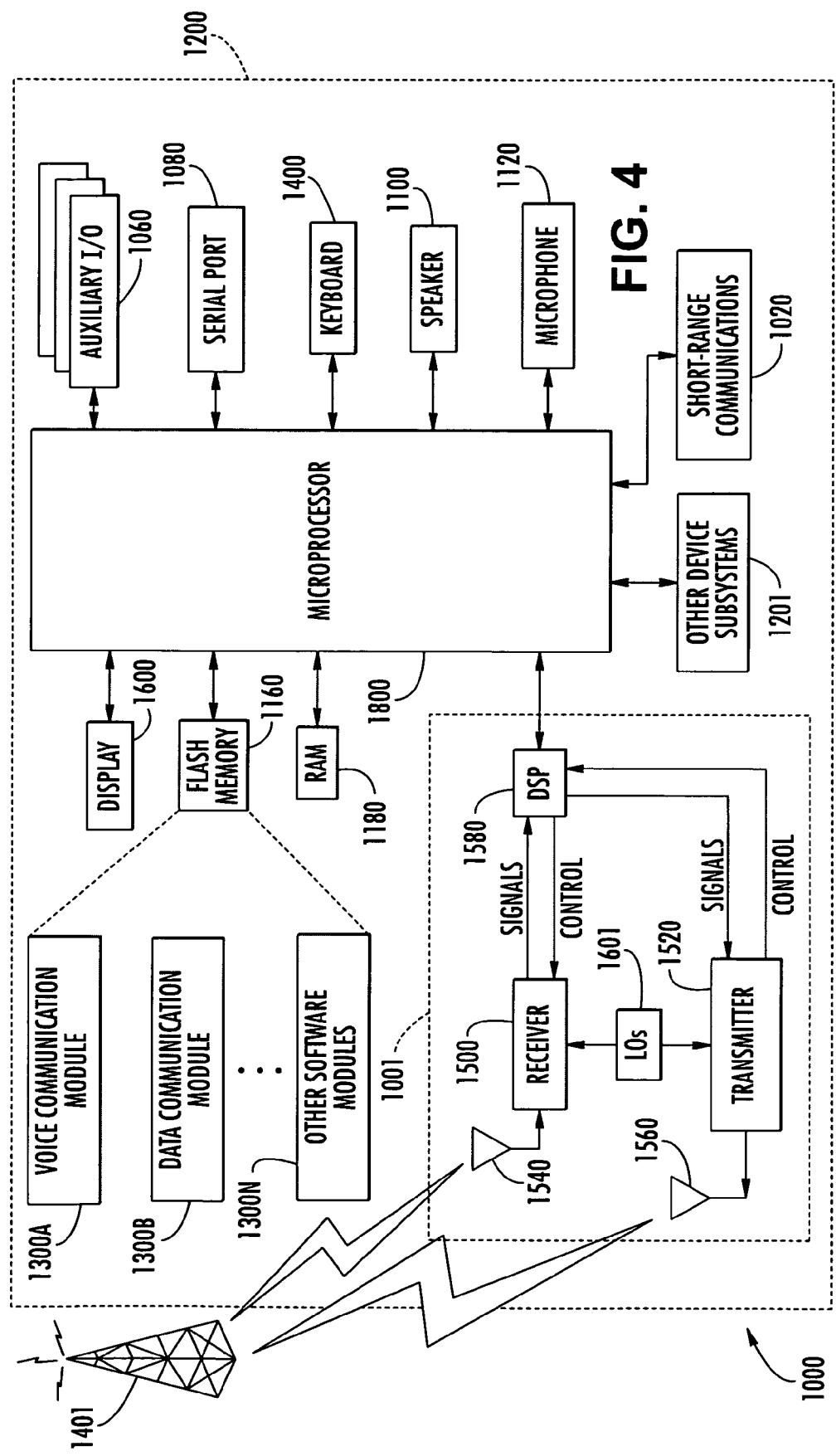
FIG. 4 is a block diagram of an exemplary hand-held mobile wireless communications device that can be used in the present invention.

In addition to the processing device 1800, other parts of the mobile device 1000 are shown schematically in FIG. 4. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system. Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device.

The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system comprising:
   a plurality of connection engines distributed among plurality of subnets and configured to access a server on an IP network;
   a mobile office platform device comprising a database for storing problem magnitudes relating to failed attempts at accessing servers using the connection engines and problem magnitudes and a preset rate of decay; and
   said mobile office platform device further comprising an intelligent routing engine operative with the database for querying the database and delaying any further attempts at accessing the server when the problem magnitude as a preset rate of decay exceeds a predetermined threshold, wherein a problem magnitude is assigned for an error based on failures unrelated to a network failure.

2. A communications system according to claim 1, wherein said intelligent routing engine is operative for delaying any reattempts at accessing a server until a problem magnitude returns to below a predetermined threshold.

3. A communications system according to claim 2, wherein any delay in reattempting access to the server is a function of a preset rate of decay of a problem magnitude.

4. A communications system according to claim 1, wherein said database includes data relating to a current problem magnitude for a failed access to a server that is added to a current exponentially decayed entry in the database.

5. A communications system according to claim 1, wherein said database includes data relating to a problem magnitude versus time for any server and connection engine pair.

6. A communications system according to claim 1, wherein a problem magnitude is assigned for an error based on failures.

7. A communications system according to claim 1, wherein said intelligent routing engine is operative for accessing a server using a POP, IMAP or httpmail protocol.

8. A communications system according to claim 1, wherein any failures unrelated to a network failure include an incorrect password and/or poorly formed request.

9. A communications system according to claim 1, wherein said intelligent routing engine comprises a proxy server.

10. A communications system comprising:
a plurality of connection engines distributed among a plurality of subnets and configured to access a server on an IP network;
a mobile office platform device comprising a database for storing problem magnitudes relating to failed attempts at accessing servers using connection engines and problem magnitudes and a present rate of decay; and
said mobile office platform device further comprising an intelligent routing engine as a proxy server operative with the database for querying the database and delaying any further attempts at accessing the server when the problem magnitude exceeds a predetermined threshold.

11. A communications system comprising:
a plurality of connection engines that can be used by a client for accessing a server of a server on an Internet Protocol (IP) network, wherein said connection engines are distributed among a plurality of subnets;
a mobile office platform device comprising a database for storing a problem magnitude versus time relating to a particular connection engine and server after attempts had been made to access servers using the connection engines and problem magnitudes as a preset rate of decay had been assigned to failures in accessing the servers; and
said mobile office platform device further comprising an intelligent routing engine operative with the database for selecting a connection engine with minimum problems when a particular server is to be accessed based on stored data within the database, wherein a problem magnitude is assigned for an error based on failures unrelated to a network failure.

12. A communications system according to Claim 11, wherein said intelligent routing engine is operative for delaying any reattempts at accessing a server until a problem magnitude returns to below a predetermined threshold.

13. A communications system according to claim 12, wherein any delay in reattempting access to a server is a function of a preset rate of decay of a problem magnitude.

14. A communications system according to claim 11, wherein said database includes data relating to a current problem magnitude for a failed access to a server that is added to a current exponentially decayed entry in the database.

15. A communications system according to claim 11, wherein said database includes data relating to a problem magnitude versus time for any server and connection engine pair.

16. A communications system according to claim 11, wherein a problem magnitude is assigned for an error based on network failures.

17. A communications system according to claim 11, wherein said intelligent routing engine is operative for accessing the server using POP, IMAP or httpmail protocol.

18. A communications system according to claim 11, wherein any failures unrelated to a network failure include an incorrect password and/or poorly formed request.

19. A communications system according to claim 11, wherein said intelligent routing engine comprises a proxy server.

20. A communications system comprising:
a plurality of connection engines distributed among a plurality of subnets and configured to access a server on an IP network;
a mobile office platform device comprising a database for storing problem magnitudes relating to failed attempts at accessing servers using connection engines and problem magnitudes and a preset rate of decay; and
said mobile office platform device further comprising an intelligent routing engine operative with the database for querying the database and delaying any further attempts at accessing the server when the problem magnitude exceeds a predetermined threshold, where a problem magnitude is assigned for an error based on failures unrelated to a network failure.

21. A method of accessing a server on an Internet Protocol (IP) network comprising the steps of:
distributing connection engines over multiple subnets;
attempting access from a mobile office platform device to a server using the connection engines and problem magnitudes and a preset rate of decay;
assigning a problem magnitude by retrieving a problem magnitude as stored at a database at the mobile office platform device if the attempt at accessing the server has failed; and
delaying any further attempts at accessing the server when the problem magnitude as a preset rate of decay exceeds a predetermined threshold and assigned a problem magnitude for an error based on failures unrelated to network failure.

22. A method according to claim 21, and further comprising the step of delaying any reattempts at accessing the server until the problem magnitude returns to below a predetermined threshold.

23. A method according to claim 22, wherein the delay in reattempting access to the server is a function of a preset rate of decay of the problem magnitude.

24. A method according to claim 21, and further comprising the step of maintaining a database of failed attempts at accessing the server.

25. A method according to claim 24, wherein a current problem magnitude for a failed access to a server is added to a current exponentially decayed entry in the database along with a time stamp.

26. A method according to claim 24, and further comprising the step of storing in the database the problem magnitude versus time for any server and connection engine pair.

27. A method according to claim 24, and further comprising the step of tracking the magnitude of failure based on the problem magnitude of failed attempts stored within the database.

28. A method according to claim 21, and further comprising the step of assigning a problem magnitude for an error based on failures.

29. A method according to claim 21, and further comprising the step of choosing a second connection engine and attempting access to the server after failing access with the first connection engine.

30. A method according to claim 21, wherein a failure unrelated to a network failure includes an incorrect password and/or poorly formed request.

31. A method according to claim 21, and further comprising the step of making a service request to the connection engine using a proxy engine.

32. A method according to claim 31, and further comprising the step of making a service request using a Wireless Application Protocol (WAP) or Simple Mail Transfer Protocol (SMTP).

33. A method according to claim 31, and further comprising the step of attempting access to a server using a POP, IMAP, or httpmail protocol.

34. A communications system comprising:
a plurality of connection engines distributed among a plurality of subnets and configured to access a server on an IP network;
a mobile office platform device comprising a database for storing problem magnitudes relating to failed attempts at accessing servers using the connection engines and problem magnitudes and a preset rate of decay; and
said mobile office platform device further comprising an intelligent routing engine operative with the database for querying the database and delaying any further attempts at accessing the server when the problem magnitude exceeds a predetermined threshold, and wherein said database includes data relating to a current problem magnitude for a failed access to a server that is added to a current exponentially decayed entry in the database.

35. A method of accessing a server on an Internet Protocol (IP) network comprising the steps of:
distributing connection engines over multiple subnets;
attempting access from a mobile office platform device to servers using the connection engines;
assigning problem magnitudes to failures in accessing any servers by retrieving a problem magnitude as stored at a database at the mobile office platform device;
storing the problem magnitude versus time as a preset rate of decay relating to a particular connection engine and server within said database; and
choosing a connection engine having minimum problems when a particular server is to be accessed based on the data stored within the database and assigning a problem magnitude for an error based on failures unrelated to a network failure.

36. A method according to claim 35, and further comprising the step of distributing the connection engines over multiple servers.

37. A method according to claim 35, wherein a current problem magnitude for a failed access to a server is added to a current exponentially decayed entry in the database along with a time stamp.

38. A method according to claim 35, and further comprising the step of terminating any further attempts at accessing a server using a first connection engine if a problem magnitude exceeds a predetermined threshold.

39. A method according to claim 38, and further comprising the step of delaying any reattempts at accessing the server until a problem magnitude returns to below a predetermined threshold.

40. A method according to claim 39, wherein the delay in reattempting access to the server is a function of a preset rate of decay of the problem magnitude.

41. A method according to claim 35, and further comprising the step of assigning a problem magnitude for an error based on network failures.

42. A method according to claim 35, and further comprising the step of choosing a second connection engine and attempting access to the server after attempting access to the server with the first connection engine has failed.

43. A method according to claim 35, wherein a failure unrelated to a network failure includes an incorrect password and/or poorly formed request.

44. A method according to claim 35, and further comprising the step of making a service request to a connection engine using a proxy engine.

45. A method according to claim 44, and further comprising the step of making a service request using a Wireless Application Protocol (WAP) or Simple Mail Transfer Protocol (SMTP).

46. A method according to claim 44, and further comprising the step of attempting access to the server using POP, IMAP, or httpmail protocol.

* * * * *